United States Patent
Sudou et al.

(10) Patent No.: US 9,114,810 B2
(45) Date of Patent: Aug. 25, 2015

(54) PRECEDING VEHICLE SELECTION APPARATUS

(71) Applicant: DENSO CORPORATION, Kariya, Aichi-pref. (JP)

(72) Inventors: Takuma Sudou, Kariya (JP); Jin Kurumisawa, Obu (JP); Toyohito Nozawa, Aichi-ken (JP); Tatsuya Namikiri, Seoul (KR)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/504,693

(22) Filed: Oct. 2, 2014

(65) Prior Publication Data

US 2015/0100228 A1  Apr. 9, 2015

(30) Foreign Application Priority Data

Oct. 3, 2013  (JP) .................................. 2013-208092

(51) Int. Cl.
*G06G 7/78* (2006.01)
*B60W 30/16* (2012.01)
(Continued)

(52) U.S. Cl.
CPC ............... *B60W 30/16* (2013.01); *G01C 21/22* (2013.01); *G01S 1/02* (2013.01); *G06G 7/78* (2013.01); *G08G 1/16* (2013.01)

(58) Field of Classification Search
USPC ............ 701/300, 96; 342/27–28, 70, 71, 175; 180/421; 340/435–436, 903; 706/46
See application file for complete search history.

(56) References Cited

U.S. PATENT DOCUMENTS 5,529,139 A * 6/1996 Kurahashi et al. ............ 180/169
5,710,565 A * 1/1998 Shirai et al. ..................... 342/70
(Continued)

FOREIGN PATENT DOCUMENTS

JP  7-081393  * 4/1995
JP  9-195916  * 7/1997
(Continued)

OTHER PUBLICATIONS

Flexible distance maintenance of autonomous vehicle in accordance with lane change of lateral position vehicle; Yun Sub Kim ; Jae SaekOh ; Jung Ha Kim; Ubiquitous Robots and Ambient Intelligence (URAI), 2014 11th International Conference on DOI: 10.1109/URAI.2014.7057442; Publication Year: 2014 , pp. 316-320.*
(Continued)

*Primary Examiner* — Cuong H Nguyen
(74) *Attorney, Agent, or Firm* — Harness, Dickey & Pierce, PLC (57) ABSTRACT

A preceding vehicle selection apparatus detects an object ahead of the own vehicle, and determines a relative position and a relative speed in relation to the own vehicle for each object ahead. Based on detection results of the object ahead, a lateral movement speed of the object ahead is determined. Based on the calculated lateral movement speed, the lateral position of the object ahead with reference to a traveling direction of the own vehicle is corrected. Based on the relative position of the object ahead of which the lateral position has been corrected, an own vehicle lane probability for each object ahead is calculated. Based on the calculated probability, a preceding vehicle from the objects ahead is selected. Based on a distance to the object ahead, the lateral position of the object ahead is corrected such that an amount of correction in the lateral position decreases as the distance increases.

10 Claims, 6 Drawing Sheets

(51) Int. Cl.
*G01S 1/02* (2010.01)
*G01C 21/22* (2006.01)
*G08G 1/16* (2006.01)

(56) References Cited

U.S. PATENT DOCUMENTS

| | | | |
|---|---|---|---|
| 6,025,797 A * | 2/2000 | Kawai et al. | 342/70 |
| 6,571,176 B1 * | 5/2003 | Shinmura et al. | 701/301 |
| 6,750,811 B2 * | 6/2004 | Asanuma et al. | 342/174 |
| 7,835,865 B2 * | 11/2010 | Okazaki et al. | 701/300 |
| 2006/0190175 A1 * | 8/2006 | Moriizumi et al. | 701/301 |
| 2009/0187290 A1 * | 7/2009 | Moriizumi et al. | 701/1 |
| 2013/0207832 A1 * | 8/2013 | Mizutani et al. | 342/70 |

FOREIGN PATENT DOCUMENTS

| | | | |
|---|---|---|---|
| JP | 2000-137900 | | 5/2000 |
| JP | 2001-246651 | * | 8/2001 |
| JP | 2006-106549 | * | 4/2006 |
| JP | 4229189 | | 12/2008 |
| JP | 2009-059082 | | 3/2009 |
| JP | 2012-028567 | * | 2/2012 |

OTHER PUBLICATIONS

Effective Lane Detection and Tracking Method Using Statistical Modeling of Color and Lane Edge-Orientation; Jin-Wook Lee ; Jae-Soo Cho; Computer Sciences and Convergence Information Technology, 2009. ICCIT '09. Fourth International Conference on DOI: 10.1109/ICCIT.2009.81; Publication Year: 2009 , pp. 1586-1591.*
Sensitivity Level Enhancement in Vehicular DGPS Receivers to Provide Exact Location Tracking on Sub-lane of a Highway Adeel, M. ; Muaz, M. ; Latif, A. ; Mahmud, S.A.; Frontiers of Information Technology (FIT), 2012 10th International Conference on DOI: 10.1109/FIT.2012.59; Publication Year: 2012 , pp. 292-297.*
Fusing GNSS, Dead-Reckoning, and Enhanced Maps for Road Vehicle Lane-Level Navigation; Toledo-Moreo, R. ; Betaille, D. ; Peyret, F. ; Laneurit, J.; Selected Topics in Signal Processing, IEEE Journal of; vol. 3 , Issue: 5; DOI: 10.1109/JSTSP.2009.2027803; Publication Year: 2009 , pp. 798-809.*

* cited by examiner

PRECEDING VEHICLE SELECTION APPARATUS

CROSS-REFERENCE TO RELATED APPLICATION

This application is based on and claims the benefit of priority from Japanese Patent Application No. 2013-208092, filed Oct. 3, 2013, the disclosure of which is incorporated herein in its entirety by reference.

BACKGROUND

1. Technical Field

The present invention relates to a technology for selecting a vehicle (preceding vehicle) that is traveling ahead of an own vehicle.

2. Related Art

As a technology for reducing operating load placed on a driver who is driving a vehicle, an inter-vehicle control apparatus is known. The inter-vehicle control apparatus detects a vehicle (preceding vehicle) that is traveling ahead of the own vehicle. The inter-vehicle control apparatus controls the vehicle speed and the like to maintain a certain distance between the own vehicle and the preceding vehicle, enabling the own vehicle to automatically track the preceding vehicle.

In this type of apparatus, a radar or the like is used to detect objects that are present ahead of the own vehicle. The preceding vehicle that should be tracked by the own vehicle is selected from among the detected objects. In addition, to enable selection of the preceding vehicle to be determined at an early stage, a predicted lateral position is calculated from a lateral movement speed of the object present ahead of the own vehicle. The predicted lateral position is also used to select the preceding vehicle (for example, refer to JP-B-4229189). The predicted lateral position information can also be considered position information in which the lateral position is corrected based on the lateral movement speed.

The lateral position information detected using a radar or the like is determined based on the position at which the radar wave is reflected. Therefore, the lateral position information does not accurately indicate a specific position (such as the center of a vehicle). As a result of the effect of the lateral position information, the predicted lateral position information also varies. In addition, an estimated path on which the own vehicle travels has significant error over long distances and on curved roads. Therefore, when the predicted lateral position information is used to select and cancel a preceding vehicle, a problem occurs in that erroneous selection easily occurs.

SUMMARY

It is thus desired to provide a technology in which erroneous selection is suppressed during selection of a preceding vehicle using lateral position information that has been corrected based on lateral movement speed.

An exemplary embodiment provides a preceding vehicle selection apparatus that includes object detecting means, lateral movement speed calculating means, lateral position correcting means, own vehicle lane probability calculating means, and preceding vehicle selecting means.

The object detecting means detects an object ahead being an object that is present ahead of the own vehicle, and determines a relative position and a relative speed in relation to the own vehicle for each object ahead.

The lateral movement calculating means calculates a lateral movement speed of the object ahead, based on detection results of the object ahead detected by the object detecting means.

The lateral position correcting means corrects the lateral position of the object ahead with reference to a traveling direction of the own vehicle, based on the lateral movement speed calculated by the lateral movement speed calculating means. This lateral position correcting means corrects the lateral position of the object ahead based on a distance to the object ahead such that an amount of correction in the lateral position decreases as the distance to the object ahead increases.

The own vehicle lane probability calculating means calculates an own vehicle lane probability for each object ahead, based on the relative position of the object ahead of which the lateral position has been corrected by the lateral position correcting means. The own vehicle lane probability is a probability of the object ahead being present in the same lane as the own vehicle.

The preceding vehicle selecting means selects a preceding vehicle from the objects ahead based on the own vehicle lane probability calculated by the own vehicle lane probability calculating means.

In the preceding vehicle selection apparatus of the present invention configured as described above, the own vehicle lane probability is calculated and the preceding vehicle is selected using the lateral position that has been corrected using the lateral movement speed. In other words, a predicted lateral position after the elapse of a certain amount of time is used. Therefore, a vehicle that is entering or leaving the own vehicle lane can be determined at an early stage. As a result, selection of a preceding vehicle can be made earlier.

In addition, the amount of correction in the lateral position is reduced as the distance increases. Therefore, erroneous determination at long distances in which error increases can be suppressed, while ensuring early determination at close distances.

In addition, the present invention can be actualized by various embodiments in addition to the above-described preceding vehicle selection apparatus. For example, the present invention can be actualized by a system of which the preceding vehicle selection apparatus is a constituent element, or a program enabling a computer to function as each means configuring the preceding vehicle selection apparatus.

DESCRIPTION OF THE EMBODIMENTS

An embodiment to which the present invention is applied will hereinafter be described with reference to the drawings.

An inter-vehicle control system 1 is mounted in an automobile. The inter-vehicle control system 1 controls the vehicle speed to maintain the inter-vehicle distance to a vehicle (preceding vehicle) traveling ahead of the own vehicle at a suitable distance.

Figure 1:
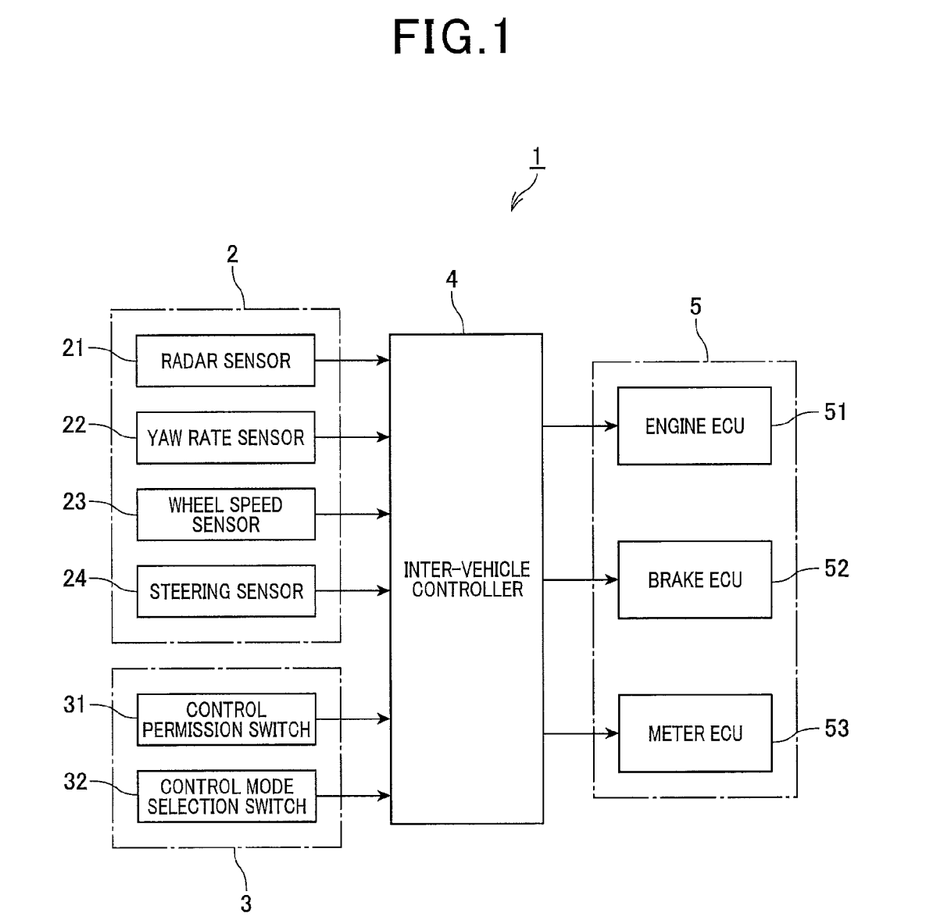
FIG. 1 is a block diagram of an overall configuration of an inter-vehicle control system including an inter-vehicle controller that is applicable to a preceding vehicle selection apparatus according to an embodiment.

As shown in FIG. 1, the inter-vehicle control system 1 is mainly configured by an inter-vehicle controller 4 that works as a preceding vehicle selection apparatus according to the embodiment. The inter-vehicle control system 1 also includes a sensor group 2, a switch group 3, and an electronic control unit (ECU) group 5. The sensor group 2 is composed of various sensors used to detect the situation surrounding the vehicle, as well as the behavior and state of the vehicle. The switch group 3 is composed of various switches used to input instructions to the inter-vehicle controller 4. The ECU group 5 performs various control operations based on commands from the inter-vehicle controller 4.

The sensor group 2 includes at least a radar sensor 21, a yaw rate sensor 22, a wheel speed sensor 23, and a steering sensor 24.

The radar sensor 21 outputs laser light towards the area ahead of the own vehicle so as to scan a predetermined angle range. The radar sensor 21 also detects reflected light of the laser light. The radar sensor 21 determines the distance to an object that has reflected the laser light based on the amount of time required for the laser light to reach and return from the object. In addition, the radar sensor 21 determines the direction in which the object is present based on the direction in which the laser light is irradiated when the reflected light is detected. The radar sensor 21 is not limited that which uses laser light. The radar sensor 21 may use millimeter waveband or micro-millimeter waveband radio waves, ultrasonic waves, or the like. Furthermore, a camera or the like may be used.

The wheel speed sensor 23 is attached to each of the left front wheel, the right front wheel, the left rear wheel, and the right rear wheel. Each wheel speed sensor 23 outputs a pulse signal having an edge (pulse edge) that is formed at every predetermined angle depending on the rotation of the wheel shaft. In other words, the wheel speed sensor 23 outputs a pulse signal having a pulse interval based on the rotation speed of the wheel shaft.

The steering sensor 24 outputs signals based on a relative steering angle of the steering wheel (amount of change in the steering angle) or an absolute steering angle of the steering wheel (actual steering angle with reference to the steering position when the vehicle traveling straight ahead).

The switch group 3 includes at least a control permission switch 31 and a control mode selection switch 32.

The control permission switch 31 is used to input whether or not execution of adaptive cruise control (ACC) is permitted. ACC is a known control operation that enables the vehicle to travel at a predetermined set speed when a preceding vehicle is not present. ACC performs tracking cruise in which a predetermined inter-vehicle distance is maintained when a preceding vehicle is present.

The control mode selection switch 32 is used to select ACC control mode.

The ECU group 5 includes at least an engine ECU 51, a brake ECU 52, and a meter ECU 53.

The engine ECU 51 controls engine start/stop, fuel injection amount, ignition timing, and the like. The engine ECU 51 includes a central processing unit (CPU), a read-only memory (ROM), a random access memory (RAM), and the like. Specifically, the engine ECU 51 controls a throttle ACT based on detection values from a sensor that detects the depression amount of an accelerator pedal. The throttle ACT is an actuator that opens and closes a throttle provided in an air intake pipe. In addition, the engine ECU 51 controls the throttle ACT to increase and decrease the driving force of an internal combustion engine based on instructions from the inter-vehicle controller 4.

The brake ECU 52 controls braking of the own vehicle. The brake ECU 52 includes a CPU, a ROM, a RAM, and the like. Specifically, the brake ECU 52 controls a brake ACT based on detection values from a sensor that detects the depression amount of a brake pedal. The brake ACT is an actuator that opens and closes a pressure-increase regulating valve and a pressure-decrease regulating valve provided in a hydraulic brake circuit. In addition, the brake ECU 52 controls the brake ACT to increase and decrease braking force of the own vehicle based on instructions from the inter-vehicle controller 4.

The meter ECU 53 performs display control of a meter display that is provided in the vehicle, based on instructions from each unit of the vehicle including the inter-vehicle controller 4. The meter ECU 53 includes a CPU, a ROM, a RAM, and the like. Specifically, the meter ECU 53 displays, in the meter display, vehicle speed, engine rotation speed, and the execution state and control mode of control performed by the inter-vehicle controller 4.

The inter-vehicle controller 4 is mainly configured by a known microcomputer that includes a CPU, a ROM, a RAM, and the like. In addition, the inter-vehicle controller 4 includes a detection circuit, an analog/digital (A/D) conversion circuit, an input/output (I/O) interface, a communication circuit, and the like. The detection circuit and the A/D conversion circuit detect signals outputted from the sensor group 2 and convert the signals to digital values. The I/O interface receives input from the switch group 3. The communication circuit communicates with the ECU group 5. These hardware configurations are common Therefore, detailed descriptions thereof are omitted.

Figure 6:
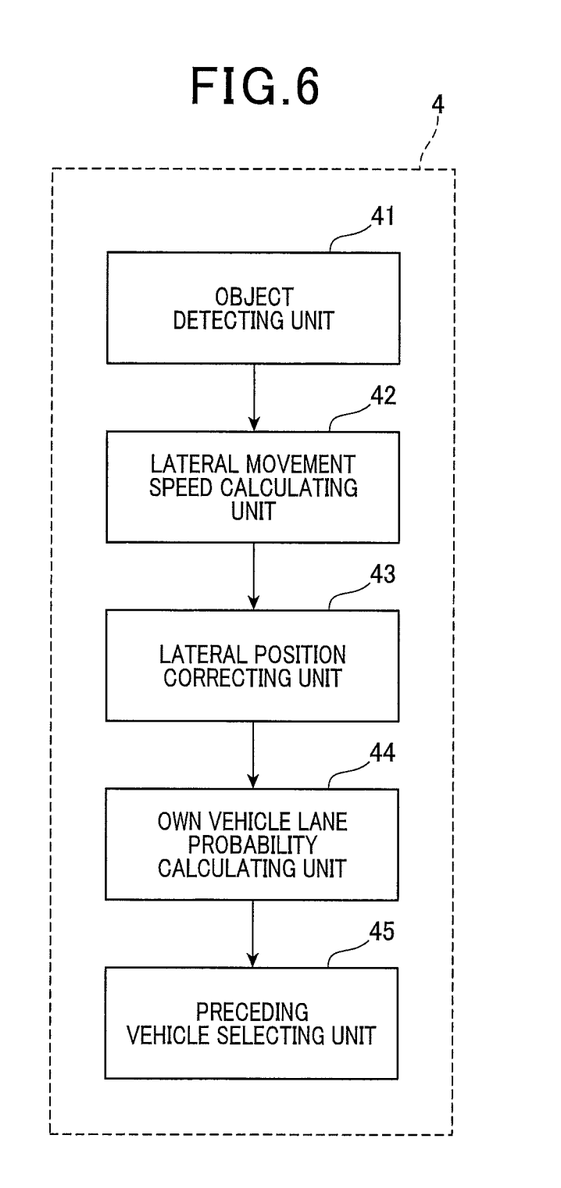
FIG. 6 is a block diagram showing a functional configuration of the inter-vehicle controller shown in FIG. 1.

In the inter-vehicle controller 4, the CPU executes one or more programs stored in advance in the memory (e.g., ROM) to perform a predetermined preceding vehicle determination process as described in detail below. Thus, as shown in FIG. 6, the inter-vehicle controller 4 is capable of working as the preceding vehicle selection apparatus that includes an object detecting unit 41 (equivalent to object detecting means), a lateral movement speed calculating unit 42 (equivalent to lateral movement speed calculating means), a lateral position correcting unit 43 (equivalent to lateral position correcting means), an own vehicle lane probability calculating unit 44 (equivalent to own vehicle lane probability calculating means), and a preceding vehicle selecting unit 45 (equivalent to preceding vehicle selecting means).

When ACC is permitted by the control permission switch 31, the inter-vehicle controller 4 periodically (such as every 100 ms) performs a preceding vehicle determination process. In addition, the inter-vehicle controller 4 performs an inter-vehicle control process selected by the control mode selection switch 32 using the determination result of the preceding vehicle determination process.

Of the processes, in the inter-vehicle control process, the inter-vehicle controller 4 ordinarily controls the vehicle speed by outputting instructions to increase and decrease the accelerator operation amount to the engine ECU 51. When control cannot be supported using the accelerator operation amount, the inter-vehicle controller 4 restricts the vehicle speed by outputting a brake command to the brake ECU 52. In addition, the inter-vehicle controller 4 outputs, to the meter ECU 53, various pieces of ACC-related display information and commands for generating an alert when predetermined conditions are met.

Figure 2:
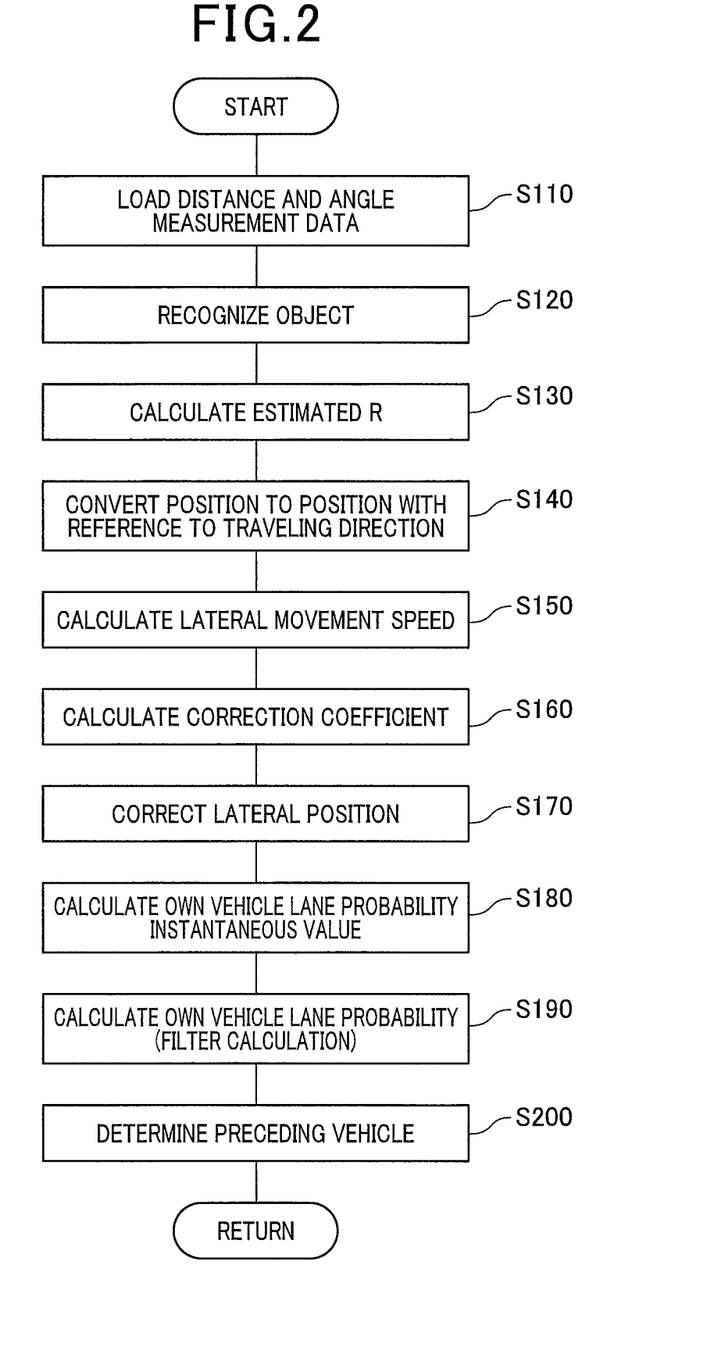
FIG. 2 is a flowchart of a preceding vehicle selection process performed by an inter-vehicle controller shown in FIG. 1.

Here, details of the preceding vehicle determination process performed by the inter-vehicle controller 4 will be described with reference to the flowchart shown in FIG. 2. In the embodiment, a program that enables the CPU of the inter-vehicle controller 4 to perform the preceding vehicle determination process shown in FIG. 2 is stored in the memory (e.g., ROM) of the inter-vehicle controller 4 in advance.

When the preceding vehicle determination process is started, first, at step S110, the inter-vehicle controller 4 loads the distance and angle measurement data detected by the radar sensor 21.

At subsequent step S120, the inter-vehicle controller 4 converts the loaded distance and angle measurement data, from the polar coordinate system expressed by the data to an orthogonal coordinate system. Based on the converted data, the inter-vehicle controller 4 performs an object recognition process to recognize an object that is present ahead of the own vehicle. In the object recognition process, the inter-vehicle controller 4 clusters the distance and angle measurement data. The inter-vehicle controller 4 then determines the center position coordinates of the object, the relative speed to the own vehicle, and the like for each cluster. The object (corresponding to an object ahead) recognized herein is referred to, hereinafter, as a "target". The inter-vehicle controller 4 performs the processing operation at step S120, and then is capable of working as the object position detecting unit 41 in FIG. 6.

At subsequent step S130, based on the yaw rate γ detected by the yaw rate sensor 22 and the own vehicle speed V calculated based on the detection results from the wheel speed sensors 23, an estimated R is calculated based on the following expression (1). The estimation R is the curve radius (reciprocal of the curvature) of an own vehicle traveling curve.

$$R = \frac{V}{\gamma} \tag{1}$$

At steps S140 to S190 described hereafter, the same process is performed on all targets acquired at step S120 (object recognition process).

At subsequent step S140, the inter-vehicle controller 4 uses the estimated R calculated at step S130 to convert the center position coordinates of the target to position coordinates under a premise that the traveling road on which the own vehicle is traveling is a straight road. At this time, to simplify the process, the vehicle width direction is the X axis. The traveling direction of the vehicle perpendicular to the vehicle width direction is the Y axis. Only the position coordinate in the X axis direction (referred to, hereinafter, as a lateral position) may be converted.

At subsequent step S150, the inter-vehicle controller 4 calculates a lateral movement speed (movement speed in the X-axis direction) based on the difference between the lateral position calculated at step S140 and the lateral position acquired in the previous processing cycle, and the time interval of the processing cycles. The inter-vehicle controller 4 performs the processing operation at step S150, and then is capable of working as the lateral movement speed calculating unit 42 in FIG. 6.

At subsequent step S160, the inter-vehicle controller 4 determines a correction coefficient α from the distance to the target (may be substituted with the position coordinate in the Y-axis direction). The correction coefficient α is calculated using a correction coefficient table that is set in advance.

Figure 3:
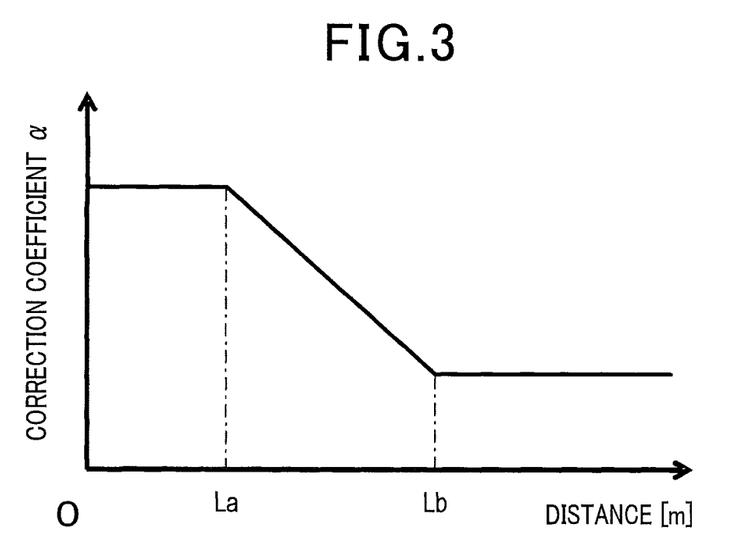
FIG. 3 is a graph showing the content of a correction coefficient table used to set a correction coefficient.

As shown in FIG. 3, the correction coefficient table is set so that the correction coefficient α is a predetermined upper limit value when the distance to the target is less than a close distance threshold La. The correction coefficient α is a predetermined lower limit value when the distance to the target is greater than a long distance threshold Lb. When the distance to the target is the close distance threshold La or greater and the long distance threshold Lb or less, the correction coefficient α is set to decrease from the upper limit value to the lower limit value as the distance to the target increases.

At subsequent step S170, the inter-vehicle controller 4 calculates a corrected lateral position Xr of the lateral position X determined at step S140 based on the lateral movement speed Vx determined at step S150 and the correction coefficient α determined at step S160, using the following expression (2).

$$Xr = X + \alpha \times Vx \times Tp \tag{2}$$

Figure 4:
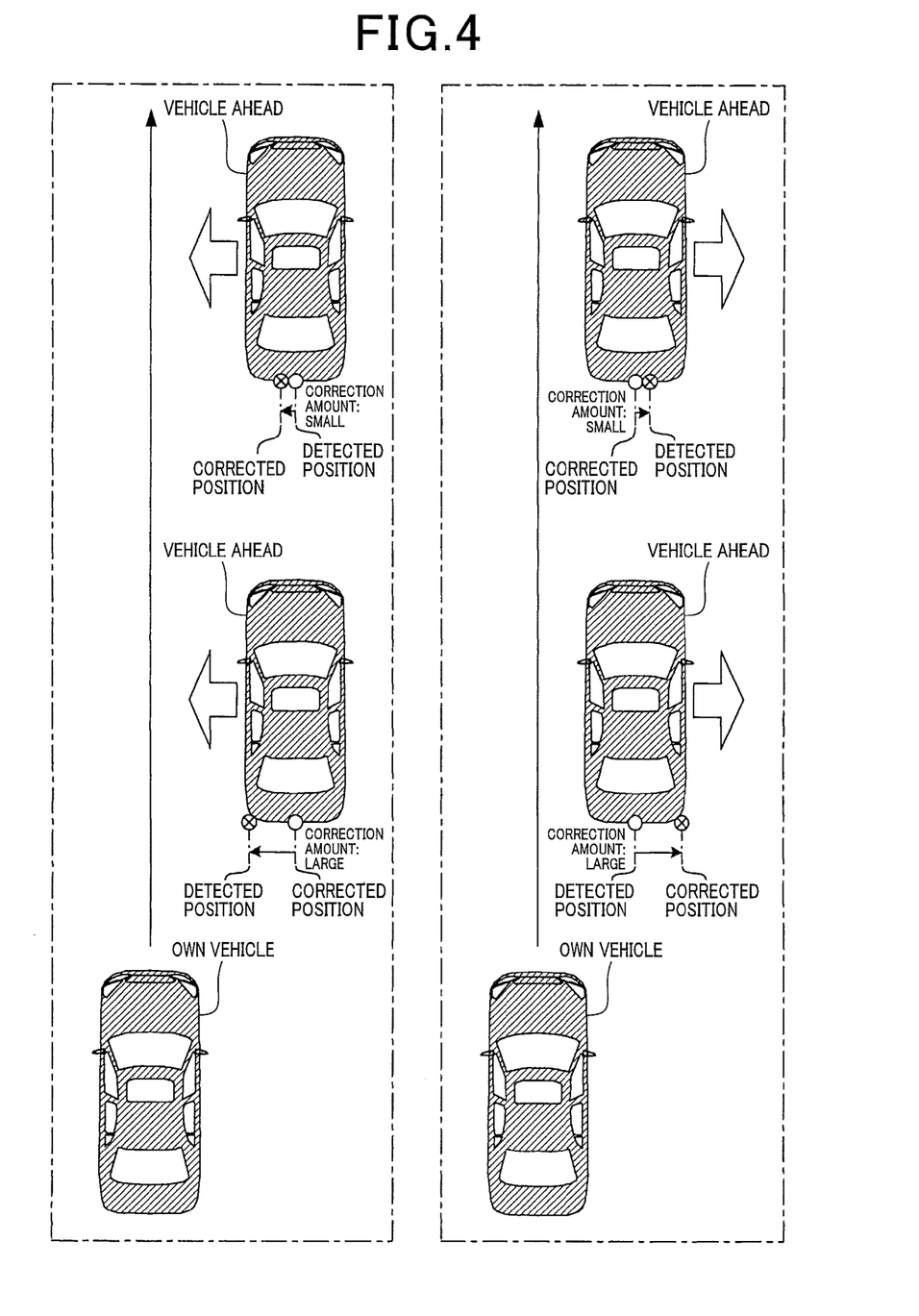
FIG. 4 is an explanatory diagram of the working of the correction coefficient.

Here, Tp is a constant that represents time. In other words, expression (2) corresponds to determining a predicted position when time Tp has elapsed from the current time, based on the lateral movement speed Vx. However, as shown in FIG. 4, as a result of the correction coefficient α, the amount of correction becomes limited as the distance to the target increases even when the lateral movement speed Vx is the same. The inter-vehicle controller 4 performs the processing operation at steps S160 and S170, and then is capable of working as the lateral position correcting unit 43 in FIG. 6.

The center position coordinates of the target which have been converted at step S140 and of which the lateral position has been corrected at step S170 are hereinafter referred to as "probability calculation position coordinates".

At subsequent step S180, the inter-vehicle controller 4 calculates an own vehicle lane probability instantaneous value for each target based on the probability calculation position coordinates. The own vehicle lane probability instantaneous value is calculated using an own vehicle lane probability map that is set in advance. The own vehicle lane probability is a parameter indicating the likelihood of the target being a vehicle that is traveling in the same lane as the own vehicle. The own vehicle lane probability instantaneous value is an instantaneous value of the own vehicle lane probability calculated based on detection data in the current processing cycle.

The own vehicle lane probability map is a known map in which the probability tends to be the highest when the probability calculation position coordinates are near the front of the own vehicle and at a close distance. In addition, the probability tends to decrease as the probability calculation position coordinates become farther and shifted in the lateral direction from the front of the own vehicle. A specific example and usage of the own vehicle lane probability map are described in detail in JP-B-3427815 and the like.

A reason for expressing whether or not the target is in the own vehicle lane in terms of probability is that an error is present between the curve radius of curvature (estimated R) determined from the yaw rate and the actual curve radius of curvature.

At subsequent step S190, the inter-vehicle controller 4 calculates an own vehicle lane probability for each target. The own vehicle lane probability is calculated by the inter-vehicle controller 4 performing a filter calculation on the own vehicle lane probability instantaneous value determined at step S180. The own vehicle lane probability is used for determination of the preceding vehicle. The filter calculation is merely required to be that which works as a so-called low-pass filter. For example, a weighted average of the own vehicle lane probability instantaneous value and the own vehicle lane probability determined in the previous processing cycle may be performed. The inter-vehicle controller 4 performs the processing operation at steps S180 and S190, and then is capable of working as the own vehicle lane probability calculating unit 44 in FIG. 6.

At subsequent step S200, the inter-vehicle controller 4 determines the preceding vehicle based on the own vehicle lane probability calculated at step S190. The inter-vehicle controller 4 then ends the process. Specifically, for example, the inter-vehicle controller 4 determines a target having the shortest distance to the own vehicle, among the targets of which the own vehicle lane probability is a threshold (such as 50%) or higher, as the preceding vehicle. The inter-vehicle controller 4 performs the processing operation at step S200, and then is capable of working as the preceding vehicle selecting unit 45 in FIG. 6.

Then, the inter-vehicle controller 4 performs the inter-vehicle control process based on the distance to the target determined to be the preceding vehicle by the preceding vehicle determination process, and the relative speed of the target. The inter-vehicle controller 4 outputs various commands to the ECU group 5.

Figure 5:
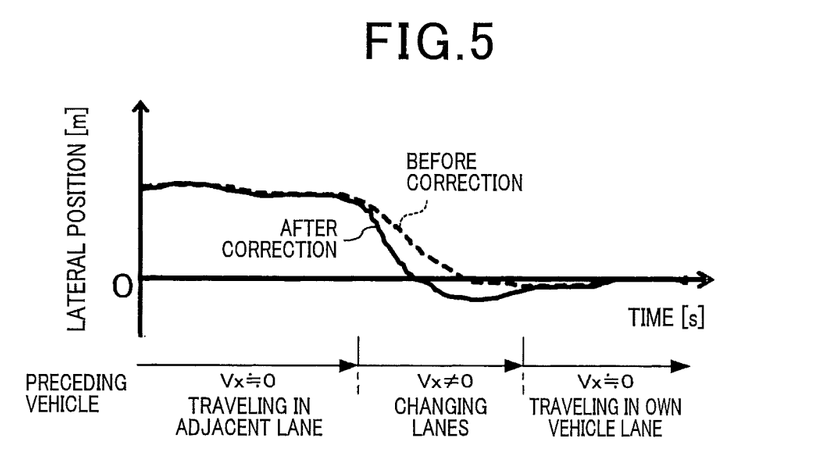
FIG. 5 is an explanatory diagram of the effects of lateral position correction.

As shown in FIG. 5, when the target (a vehicle traveling ahead) is traveling in an adjacent lane, the lateral movement speed Vx of the target is substantially zero. Therefore, the detected lateral position and the corrected lateral position are substantially the same. When the target attempts to change lanes to the own vehicle lane and approaches the own vehicle lane side, the lateral movement speed Vx holds a value.

Therefore, the lateral position is corrected to a position closer to the own vehicle lane by an amount based on the lateral movement speed Vx. As a result, the merging vehicle can be promptly selected as the preceding vehicle. Subsequently, when lane changing is completed, the lateral movement speed Vx returns once again to substantially zero. Therefore, the detected lateral position and the corrected lateral position are substantially the same.

Conversely, when the target changes lanes from the own vehicle lane to an adjacent lane, the lateral position is corrected to a position farther away from the own vehicle lane by an amount based on the lateral movement speed Vx (not shown). As a result, selection of the preceding vehicle can be promptly canceled.

As described above, in the inter-vehicle control system 1, the own vehicle lane probability is calculated and the preceding vehicle si selected using the lateral position Xr that has been corrected using the lateral movement speed Vx. In other words, the predicted lateral position after the elapse of a certain amount of time Tp is used. Therefore, a vehicle that is entering or leaving the own vehicle lane can be determined at an early stage. Responsiveness of selection and canceling of a preceding vehicle can be improved.

In addition, the amount of correction in the lateral position is reduced as the distance increases, using the correction coefficient α. Therefore, erroneous determination at long distances in which error increases can be suppressed, while ensuring early determination at close distances.

Other Embodiments

An embodiment of the present invention is described above. However, the present invention is not limited to the above-described embodiment. It goes without saying that various embodiments are possible.

(1) According to the above-described embodiment, the estimation R is calculated from the yaw rate detected by the yaw rate sensor. However, the estimated R may be calculated from the steering angle detected by the steering sensor.

(2) According to the above-described embodiment, to calculate the corrected lateral position Xr, a non-dimensional correction coefficient α is used and multiplied with the predicted lateral position (Vx×TP). However, a time-dimensional correction coefficient β (=α×Tp) may be used and multiplied with the lateral movement speed Vx. In this case, the corrected lateral position Xr may be calculated by the following expression (3).

$$Xr = X + \beta \times Vx \qquad (3)$$

(3) According to the above-described embodiment, an example is given in which the present invention is applied to an inter-vehicle control system. However, this is not limited thereto. The present invention may be applied to any system as long as the system sets a preceding vehicle and performs control of some kind based on the state of the preceding vehicle or the relative state between the preceding vehicle and the own vehicle.

(4) The constituent elements of the present invention are conceptual and are not limited to those according to the present embodiment. For example, functions provided by a single constituent element may be dispersed among a plurality of constituent elements. Alternatively, the functions of a plurality of constituent elements may be integrated in a single constituent element. In addition, at least some of the configurations according to the above-described embodiment may be replaced with a known configuration having similar functions. In addition, at least some of the configurations according to the above-described embodiment may, for example, be added to or substituted for other configurations according to the above-described embodiment.

What is claimed is:

1. A preceding vehicle selection apparatus comprising:
    object detecting means that detects an object ahead of the own vehicle, and determines a relative position and a relative speed in relation to the own vehicle for each object ahead;
    lateral movement speed calculating means that calculates a lateral movement speed of the object ahead, based on detection results of the object ahead detected by the object detecting means;
    lateral position correcting means that corrects the lateral position of the object ahead with reference to a traveling direction of the own vehicle, based on the lateral movement speed calculated by the lateral movement speed calculating means;
    own vehicle lane probability calculating means that calculates an own vehicle lane probability for each object ahead, based on the relative position of the object ahead of which the lateral position has been corrected by the lateral position correcting means, the own vehicle lane probability being a probability of the object ahead being present in the same lane as the own vehicle; and
    preceding vehicle selecting means that selects a preceding vehicle from the objects ahead based on the own vehicle lane probability calculated by the own vehicle lane probability calculating means,
    the lateral position correcting means correcting the lateral position of the object ahead based on a distance to the object ahead such that an amount of correction in the lateral position decreases as the distance to the object ahead increases.

2. The preceding vehicle selection apparatus according to claim 1, wherein the lateral position correcting means corrects the lateral position by adding a correction value to the lateral position, the correction value being a value that is obtained by multiplying the relative speed by a correction coefficient that changes depending on the distance to the object ahead.

3. The preceding vehicle selection apparatus according to claim 2, wherein:
the correction coefficient is set to a predetermined upper limit value when the distance to the object ahead is less than a first threshold for a close distance;
the correction coefficient is set to a predetermined lower limit value when the distance to the object ahead is greater than a second threshold for a long distance; and
the correction coefficient is set to decrease from the upper limit value to the lower limit value as the distance to the object ahead increases, when the distance to the object ahead is the first threshold or greater and the second threshold or less.

4. The preceding vehicle selection apparatus according to claim 3, wherein
the corrected lateral position is determined by $$Xr=X+\alpha \times Vx \times Tp$$

where: X is a lateral position; $\alpha$ is a non-dimensional correction coefficient; Vx is a lateral movement speed; Tp is a constant that represents time; and Xr is a corrected lateral position of the lateral position X.

5. The preceding vehicle selection apparatus according to claim 3, wherein
the corrected lateral position is determined by $$Xr=X+\beta \times Vx$$

where: X is a lateral position; $\beta$ is a time-dimensional correction coefficient; Vx is a lateral movement speed; and Xr is a corrected lateral position of the lateral position X.

6. A preceding vehicle selection method comprising:
detecting, by a preceding vehicle selection apparatus, an object ahead of the own vehicle, and determining a relative position and a relative speed in relation to the own vehicle for each object ahead;
calculating, by the preceding vehicle selection apparatus, a lateral movement speed of the object ahead, based on detection results of the object ahead;
correcting, by the preceding vehicle selection apparatus, the lateral position of the object ahead with reference to a traveling direction of the own vehicle, based on the calculated lateral movement speed;
calculating, by the preceding vehicle selection apparatus, an own vehicle lane probability for each object ahead, based on the relative position of the object ahead of which the lateral position has been corrected, the own vehicle lane probability being a probability of the object ahead being present in the same lane as the own vehicle;
selecting a preceding vehicle from the objects ahead based on the calculated own vehicle lane probability; and
correcting, by the preceding vehicle selection apparatus, the lateral position of the object ahead based on a distance to the object ahead such that an amount of correction in the lateral position decreases as the distance to the object ahead increases.

7. The preceding vehicle selection method according to claim 6, wherein
the lateral position is corrected by adding a correction value to the lateral position, the correction value being a value that is obtained by multiplying the relative speed by a correction coefficient that changes depending on the distance to the object ahead.

8. The preceding vehicle selection method according to claim 7, wherein:
the correction coefficient is set to a predetermined upper limit value when the distance to the object ahead is less than a first threshold for a close distance;
the correction coefficient is set to a predetermined lower limit value when the distance to the object ahead is greater than a second threshold for a long distance; and
the correction coefficient is set to decrease from the upper limit value to the lower limit value as the distance to the object ahead increases, when the distance to the object ahead is the first threshold or greater and the second threshold or less.

9. The preceding vehicle selection method according to claim 8, wherein
the corrected lateral position is determined by $$Xr=X+\alpha \times Vx \times Tp$$

where: X is a lateral position; $\alpha$ is a non-dimensional correction coefficient; Vx is a lateral movement speed; Tp is a constant that represents time; and Xr is a corrected lateral position of the lateral position X.

10. The preceding vehicle selection method according to claim 8, wherein
the corrected lateral position is determined by $$Xr=X+\beta \times Vx$$

where: X is a lateral position; $\beta$ is a time-dimensional correction coefficient; Vx is a lateral movement speed; and Xr is a corrected lateral position of the lateral position X.

* * * * *

UNITED STATES PATENT AND TRADEMARK OFFICE
CERTIFICATE OF CORRECTION

PATENT NO. : 9,114,810 B2
APPLICATION NO. : 14/504693
DATED : August 25, 2015
INVENTOR(S) : Takuma Sudou et al.

It is certified that error appears in the above-identified patent and that said Letters Patent is hereby corrected as shown below:

At column 9, claim number 4, line number 24, delete "a" and insert -- $\alpha$ --.

At column 10, claim number 9, line number 37, delete "a" and insert -- $\alpha$ --.

Signed and Sealed this
Fifteenth Day of March, 2016

Michelle K. Lee
*Director of the United States Patent and Trademark Office*